United States Patent [19]
Iwai et al.

[11] Patent Number: 5,460,744
[45] Date of Patent: Oct. 24, 1995

[54] AGENTS USED FOR IMPROVING THE BOTTOM AND WATER QUALITY IN WATER AREAS WHERE SLUDGE IS DEPOSITED

[75] Inventors: Shigeshisa Iwai; Michiharu Kobayashi, both of Kyoto; Chihiro Uchida, Tazimi; Koji Kuroda; Shigeru Toda, both of Ono, all of Japan

[73] Assignee: Biochem Industrial Ltd, Hyogo, Japan

[21] Appl. No.: 319,390

[22] Filed: Oct. 6, 1994

Related U.S. Application Data

[62] Division of Ser. No. 114,232, Jul. 26, 1993, Pat. No. 5,387,343.

[30] Foreign Application Priority Data

Aug. 20, 1992 [JP] Japan .................................. 4-245596
May 18, 1993 [JP] Japan .................................. 5-116213

[51] Int. Cl.⁶ .................................. C02F 1/52; C02F 3/28
[52] U.S. Cl. .......................... 252/181; 252/180; 252/82; 252/84; 210/610
[58] Field of Search .................................. 252/180, 181, 252/80, 82, 84; 210/610

[56] References Cited

U.S. PATENT DOCUMENTS

| | | | |
|---|---|---|---|
| 3,505,213 | 4/1970 | Anthony et al. | 210/747 |
| 3,855,121 | 12/1974 | Gough | 210/610 |
| 4,263,142 | 4/1981 | Burton | 210/747 |
| 4,879,046 | 11/1989 | Kojima | 210/747 |
| 4,895,665 | 1/1990 | Colelli et al. | 210/710 |
| 5,011,604 | 4/1991 | Wilde et al. | 210/602 |
| 5,387,343 | 2/1995 | Iwai et al. | 210/610 |

FOREIGN PATENT DOCUMENTS 107204  5/1984  European Pat. Off.
1-271517  10/1989  Japan.

*Primary Examiner*—Prince Willis, Jr.
*Assistant Examiner*—James M. Silbermann
*Attorney, Agent, or Firm*—Jordan and Hamburg

[57] ABSTRACT

A method for improving the quality of bottom and water in water areas where sludge is deposited on the bottom. In a sample water area, lime, activated sludge and anaerobic sludge, diatomaceous earth or zeolite, and photosynthesis bacteria solution are spread. Before spreading, the photosynthesis bacteria solution is infiltrated into at least either one of the activated sludge and anaerobic sludge, and the diatomaceous earth or zeolite. For the above method, four kinds of the above agents are prepared in a predetermined proportion, and they are separately packed.

1 Claim, 12 Drawing Sheets

AGENTS USED FOR IMPROVING THE BOTTOM AND WATER QUALITY IN WATER AREAS WHERE SLUDGE IS DEPOSITED

This is a division, of application Ser. No. 08/114,232, filed Jul. 26, 1993 now U.S. Pat. No. 5,387,343.

BACKGROUND OF THE INVENTION

1. Field of the Invention

The present invention relates to a method for improving the quality of bottom and water in closed water areas such as river mouths, lakes, ponds, bogs, etc., where water does not flow or flows very gently, and also relates to a set of agents used in the method.

2. Description of the Prior Art

As is generally known, sewage, and dirty water used in agricultural and industrial processes flow into closed water areas such as river mouths, lakes, ponds, bogs, etc., where water flows very gently. And in such closed water areas, because of mud deposits on the bottom, the water quality deteriorates, thereby presenting the problem of adversely affecting the ecosystem. In order to counteract the above problem, the sludge is either dredged or covered by sand. Alternatively, a sludge precipitation agents composed of zeolite processed in a special manner, or lime (quick lime or granular slaked lime) is spread.

However, when adopting the dredging method, the disposal of the sludge after being dredged out and a huge construction expense are the problems. Moreover, when dredging out, since the sludge is stirred at the bottom, the water quality there becomes even worse. On the other hand, when adopting the method of covering the sludge by sand, since the bottom surface becomes higher, shipping lanes may be disturbed, and again the huge construction expense is required. Moreover, sand or mud deposits may be spread out.

In the last method mentioned, the sludge precipitation agent composed of zeolite processed in a special manner is too expensive to be practically used.

A method of spreading granular slaked lime was presented by inventors of the present invention ("Environmental Conservation Engineering", Search Institute of Environmental Technology, Vol. 17, No. 12, Dec. 30, 1988, Vol. 18, No. 6, Jun. 30, 1989, Vol. 19, No. 5, May 30, 1990, and Vol. 19, No. 8, Aug. 30, 1990). As presented, when granular slaked lime is spread (200 g/m$^2$), lime reacts with hydrogen sulfide in water and sludge, and hydrogen sulfide is destroyed. A calcium sulphate film was formed on the mud deposits, and this film serves as a barrier between mud deposits and water. This method enables various materials to be prevented from eluting into water, which may deteriorate water quality (hereinafter referred to as lime spreading method).

In the lime spreading method, only quick lime or granular slaked lime is spread. Therefore, this method has an advantage of low cost. This method is also beneficial for raising fish and shellfish by releasing Ca ions. Because of the above two advantages, the lime spreading method has been viewed with interest. However, this method also presents the following problems: water remains cloudy for several days after spreading lime (will be clear later); a long time is required for improving water (for example, a long time is required for reducing a BOD value); a long time is required for precipitating suspended matters in water; and decomposition of the sludge isolated from the water by the calcium sulphate film is left to the natural phenomenon.

SUMMARY OF THE INVENTION

An object of the present invention is to provide a method for improving the quality of bottom and water in water areas where sludge is deposited on the bottom.

Another object of the present invention is to provide a method for improving the quality of bottom and water in water areas, which is beneficial for raising fish and shellfish by releasing a large amount of Ca ions.

Yet another object of the present invention is to provide a method for improving the quality of bottom and water in water areas, which permits aggressive decompositions of sludge isolated from water by a calcium sulphate film.

In order to achieve the above objects, the method for improving the quality of bottom and water in water areas in accordance with the present invention is characterized in the following:

In a sample water area, lime, activated sludge and anaerobic sludge, diatomaceous earth or zeolite, and photosynthesis bacteria solution are spread. Here, the photosynthesis bacteria solution is infiltrated beforehand into either one of the activated sludge and anaerobic sludge, and the diatomaceous earth or zeolite. The above materials are preferably spread in the order of the activated sludge and anaerobic sludge, and the lime. Thereafter, the activated sludge and anaerobic sludge, the diatomaceous earth or zeolite, and the photosynthesis bacteria solution are to be spread in the sample water area.

The present invention is also characterized in that lime, activated sludge and anaerobic sludge, and diatomaceous earth or zeolite are spread in the sample water area, alternatively the activated sludge and anaerobic sludge, the diatomaceous earth or zeolite, and photosynthesis bacteria solution are spread in the sample water area.

In the above arrangement, when spreading activated sludge and anaerobic sludge in the sample water area, anaerobic bacteria contained in the activated sludge and anaerobic sludge are activated, and hydrogen sulfide and methane are generated and released. Next, when spreading the lime, released hydrogen sulfide reacts with the lime. As a result, calcium sulphate is formed, and a film of calcium sulphate is formed on the surface of the mud deposits. Therefore, the mud deposits become more anaerobic, and the anaerobic bacteria are more aggressively activated.

The remaining hydrogen sulfide which did not react with the lime is decomposed by photosynthesis bacteria in the photosynthesis bacteria solution to be spread next in the sample water area. On the other hand, because a portion above the film is aerobic, organic materials in water are decomposed by aerobic bacteria in the activated sludge and anaerobic sludge to be spread after the lime. Additionally, the diatomaceous earth or zeolite serves as a carrier of bacteria.

According to the present invention, an improvement in the quality of bottom and water in the closed water areas where sludge is deposited on the bottom, such as lakes, ponds, bogs, river mouths, seas, etc., can be achieved. Moreover, because the amount of Ca ions increases in the closed water areas, the present invention is beneficial for raising fish and shellfish.

The present invention also permits decomposition of sludge isolated from the water by the calcium sulphate film, which is not enabled by the previously mentioned lime spreading method.

Furthermore, in the lime spreading method, water became cloudy after spreading the agents, and will not be clear for several days. On the other hand, in the method of the present invention, water was clear in approximately 24 hours after spreading the agents.

BRIEF DESCRIPTION OF THE DRAWINGS

FIGS. 1 through 12 show one embodiment of the present invention, in which:

FIG. 1 is an explanatory view showing conditions in treated area in the example 3 of the present invention;

FIG. 2 is a graph showing the results of measurements of organic nitrogen contained in mud deposits;

FIG. 3 is a graph showing the results of measurements of organic phosphoric acid contained in mud deposits;

FIG. 4 is a graph showing the results of measurements of inorganic nitrogen contained in mud deposits;

FIG. 5 is a graph showing the results of measurements of inorganic phosphoric acid contained in mud deposits;

FIG. 6 is a graph showing the results of measurements of ignition loss of mud deposits;

FIG. 7 is a graph showing the results of measurements of the organic nitrogen contained in mud deposits;

FIG. 8 is a graph showing the results of measurements of organic phosphoric acid contained in mud deposits;

FIG. 9 is a graph showing the results of measurements of inorganic nitrogen contained in mud deposits;

FIG. 10 is a graph showing the results of measurements of inorganic phosphoric acid contained in mud deposits;

FIG. 11 is a graph showing the results of measurements of ignition loss of the mud deposits; and FIG. 12($a$) and FIG. 12($b$) are explanatory views showing the installing places of the equipments used in measuring the settlements.

DESCRIPTION OF THE EMBODIMENTS

Figure 1:
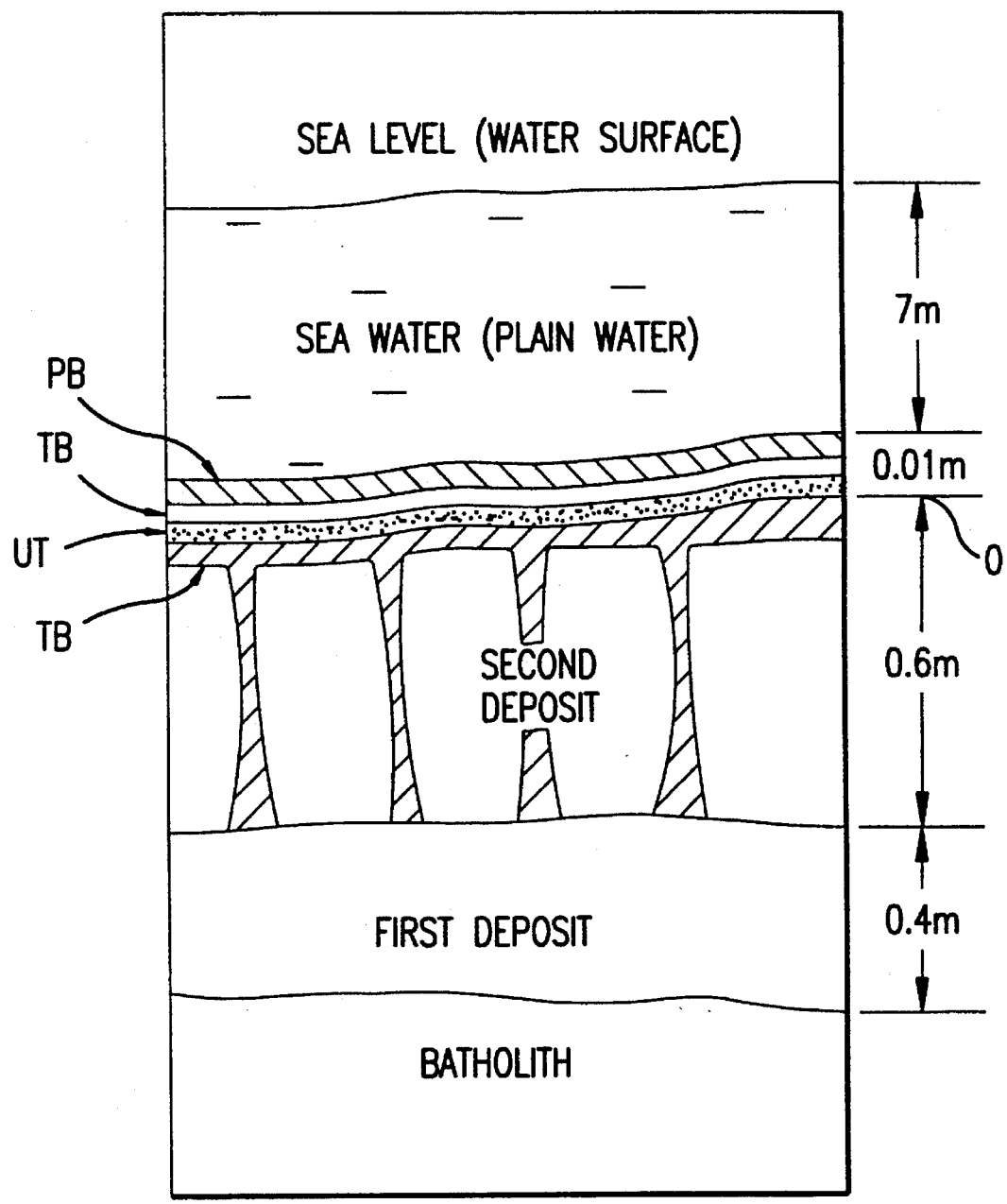
Figure 2:
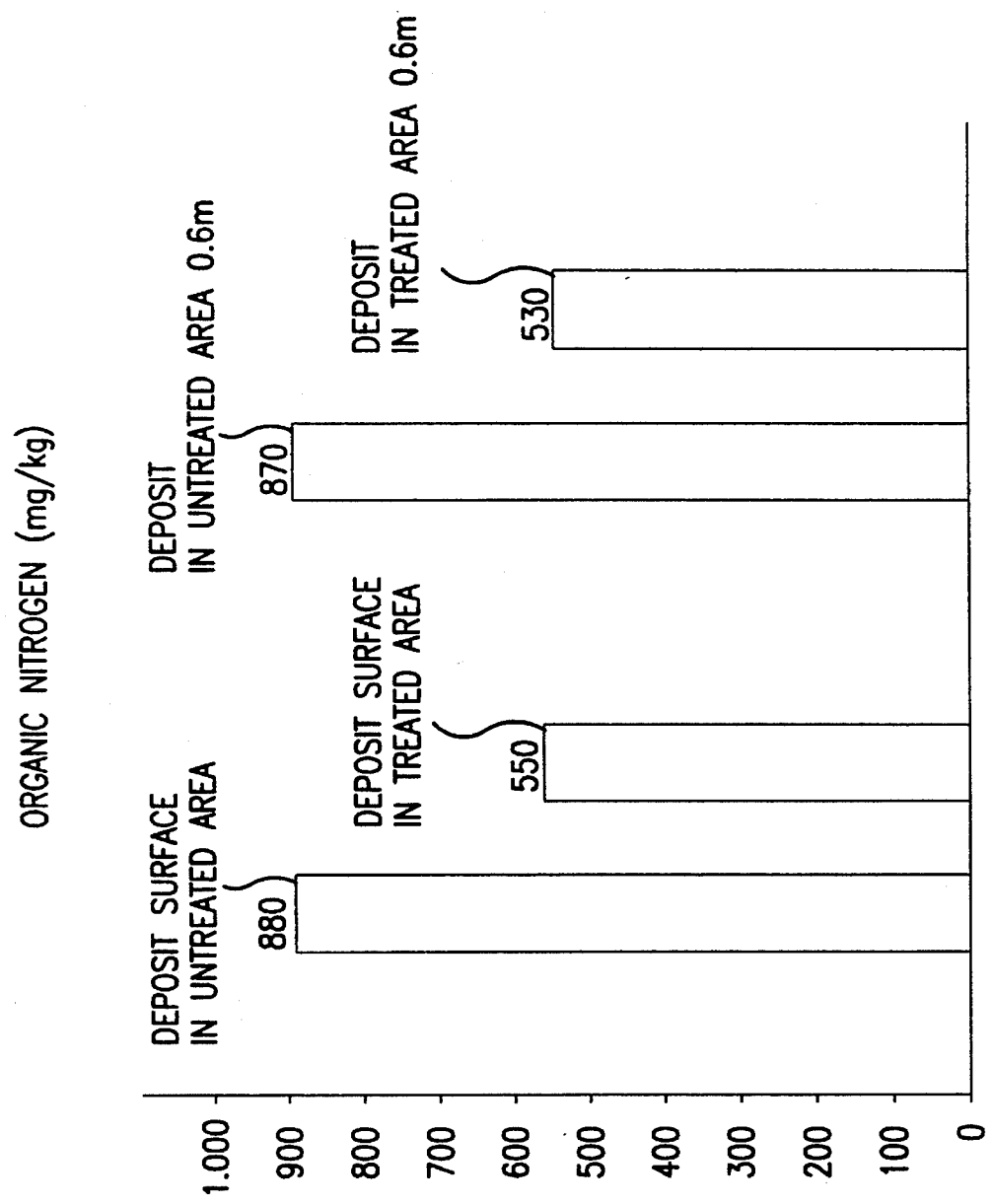
Figure 3:
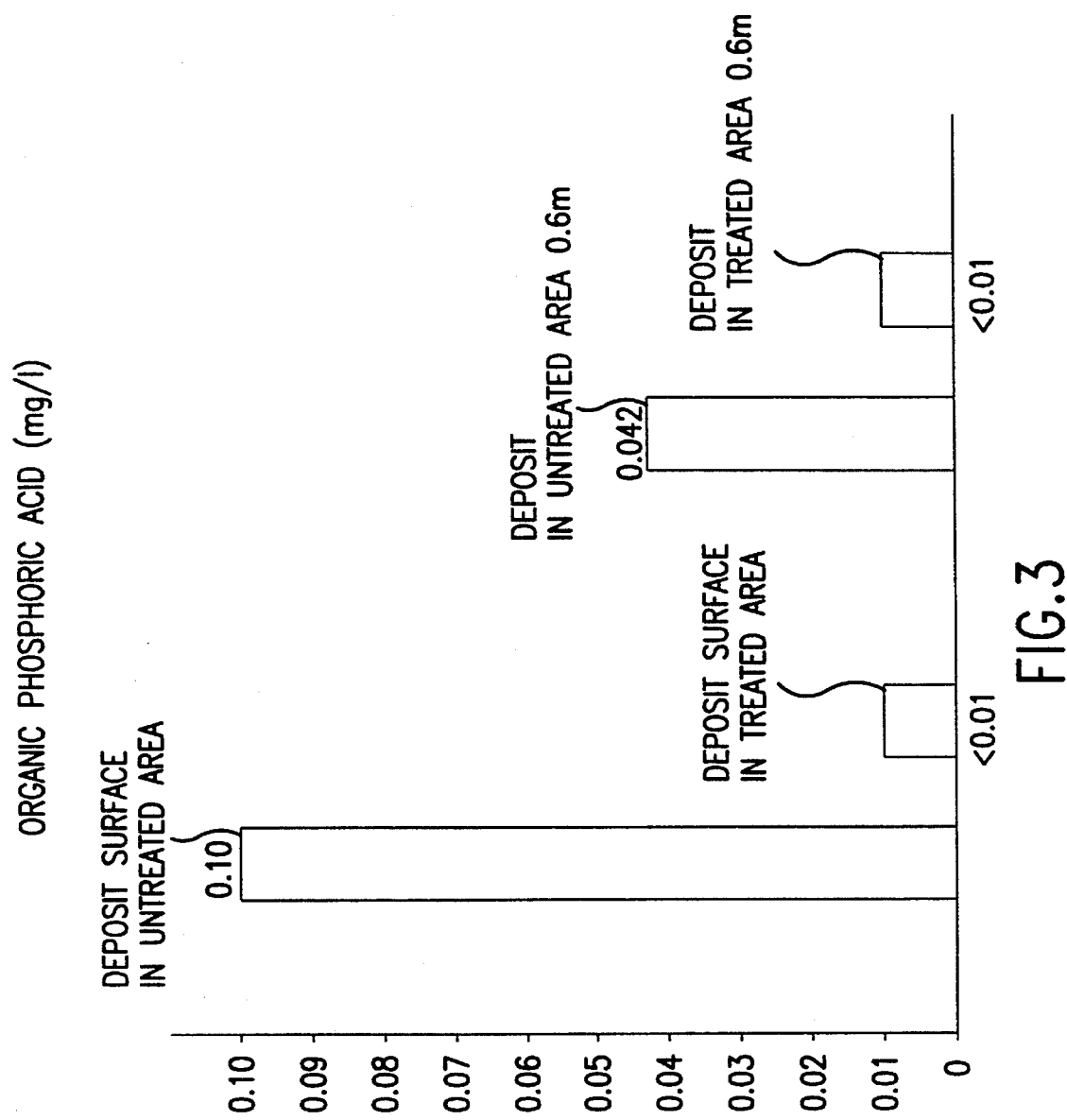
Figure 4:
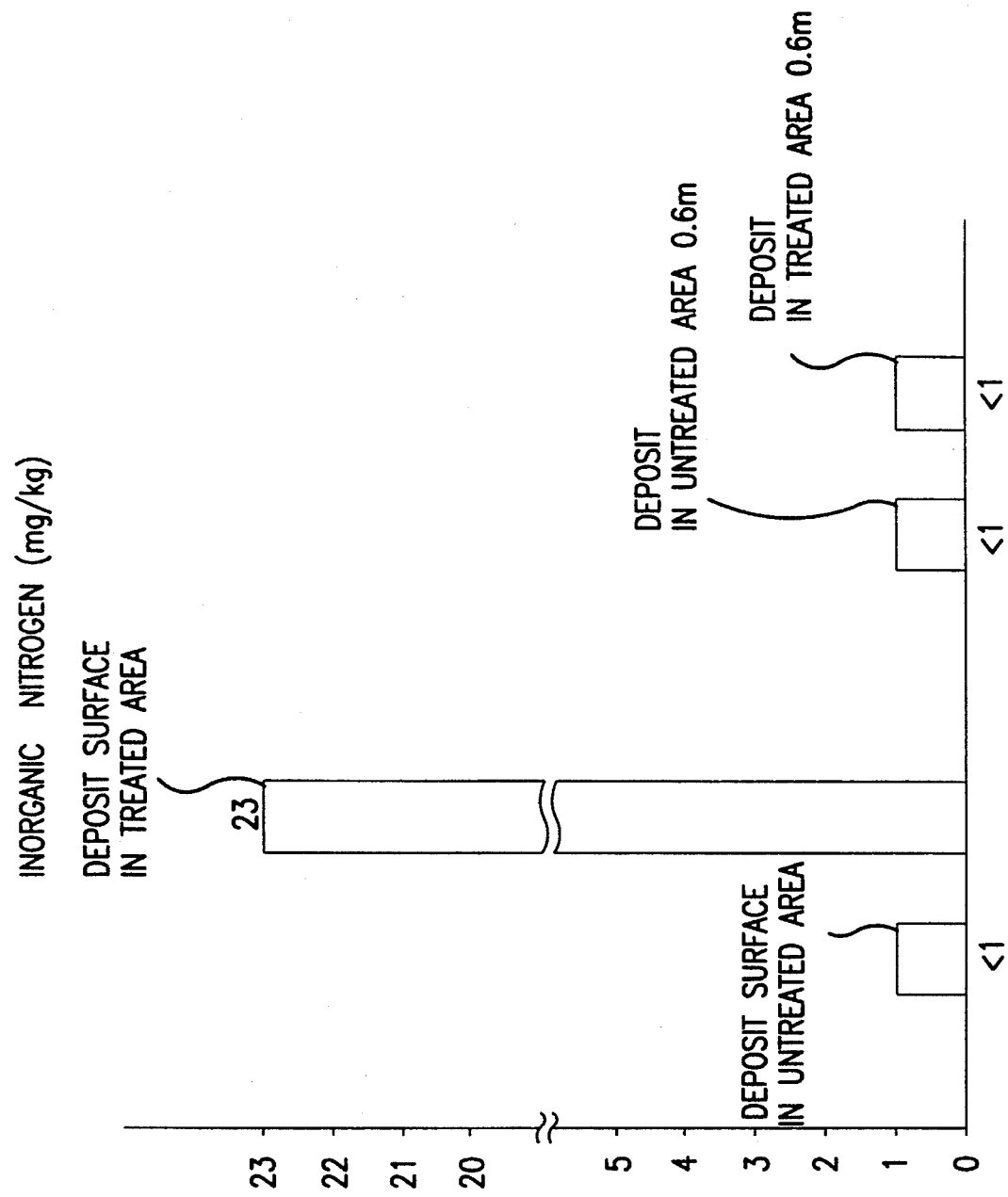
Figure 5:
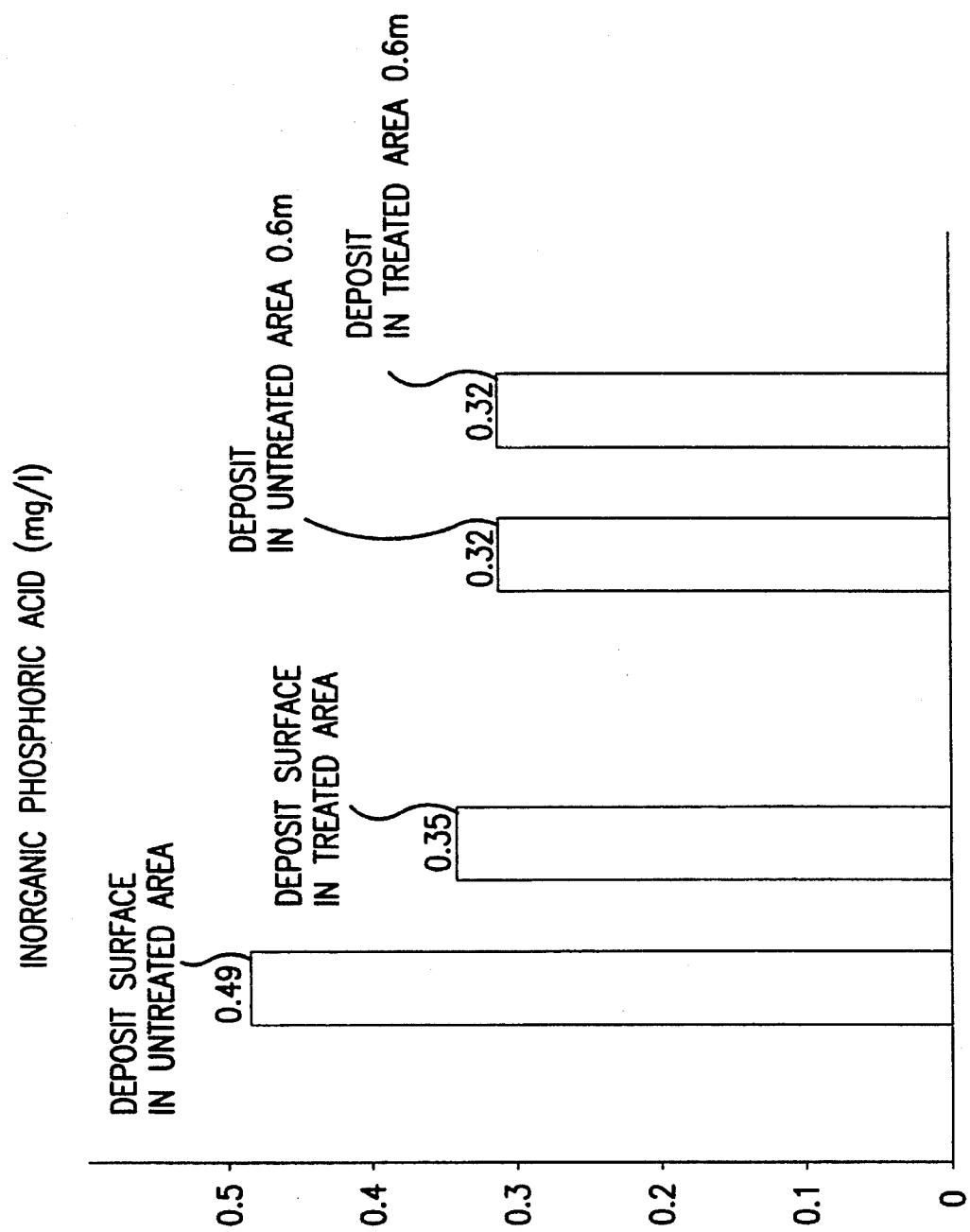
Figure 6:
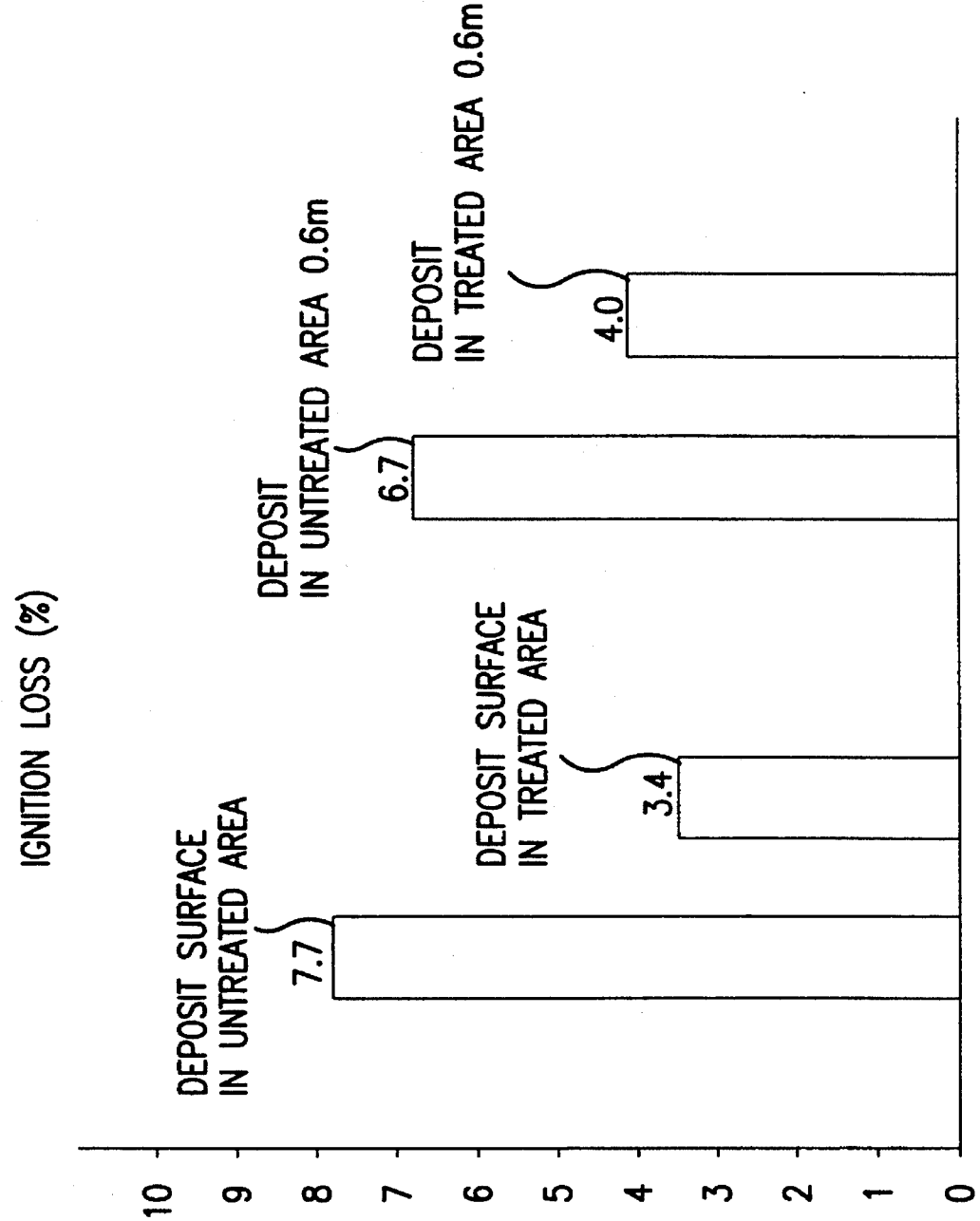
Figure 7:
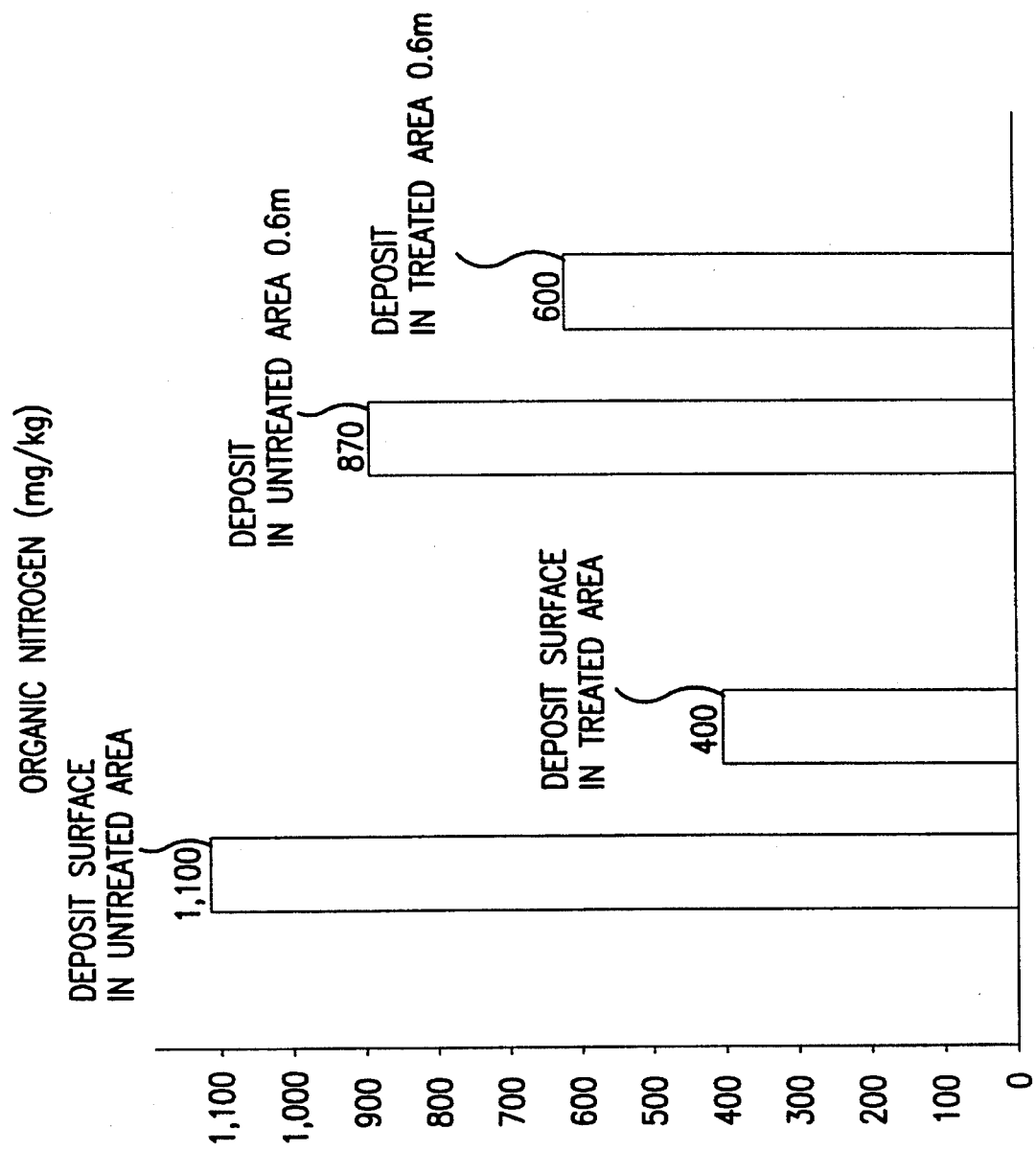
Figure 8:
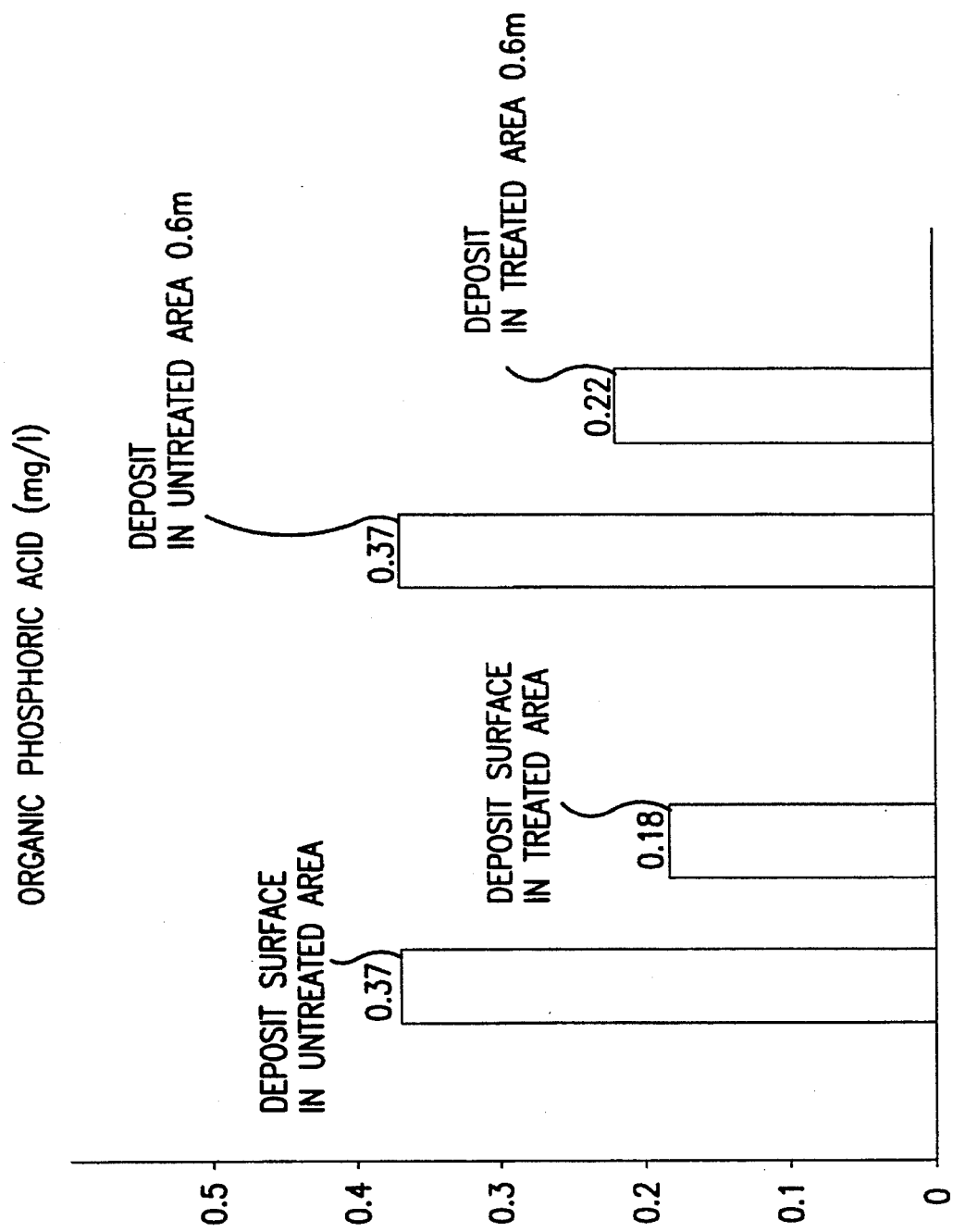
Figure 9:
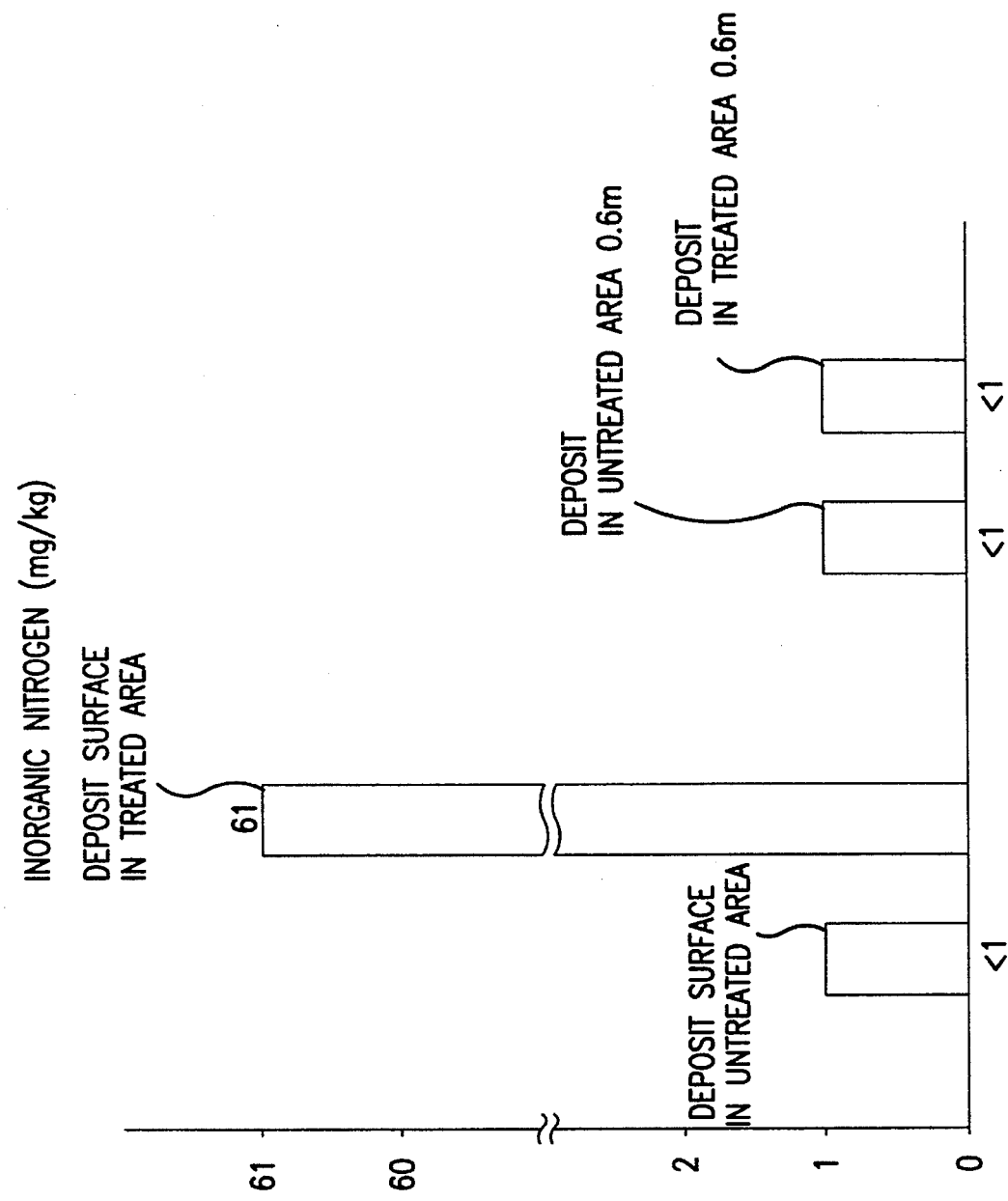
Figure 10:
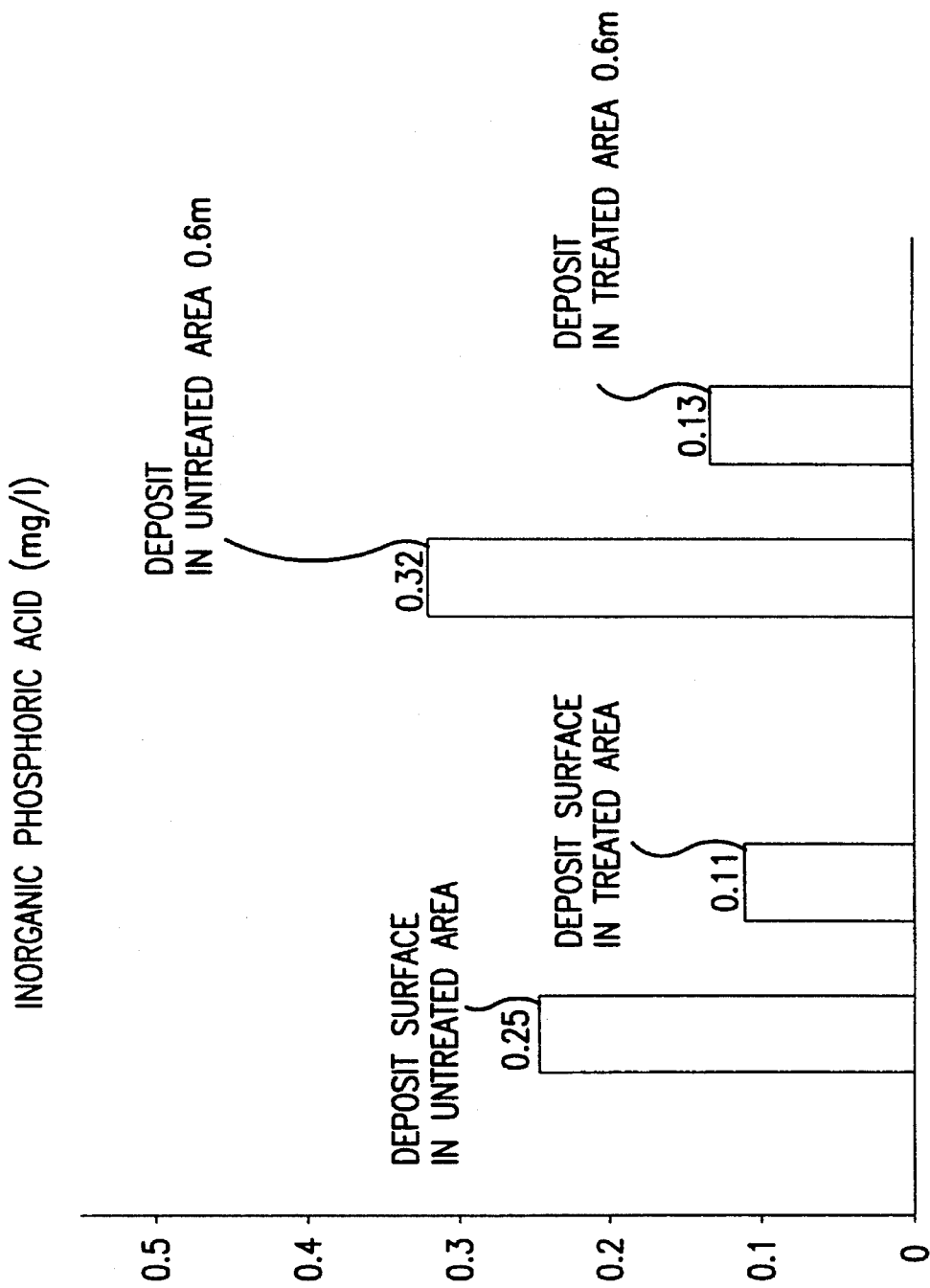
Figure 11:
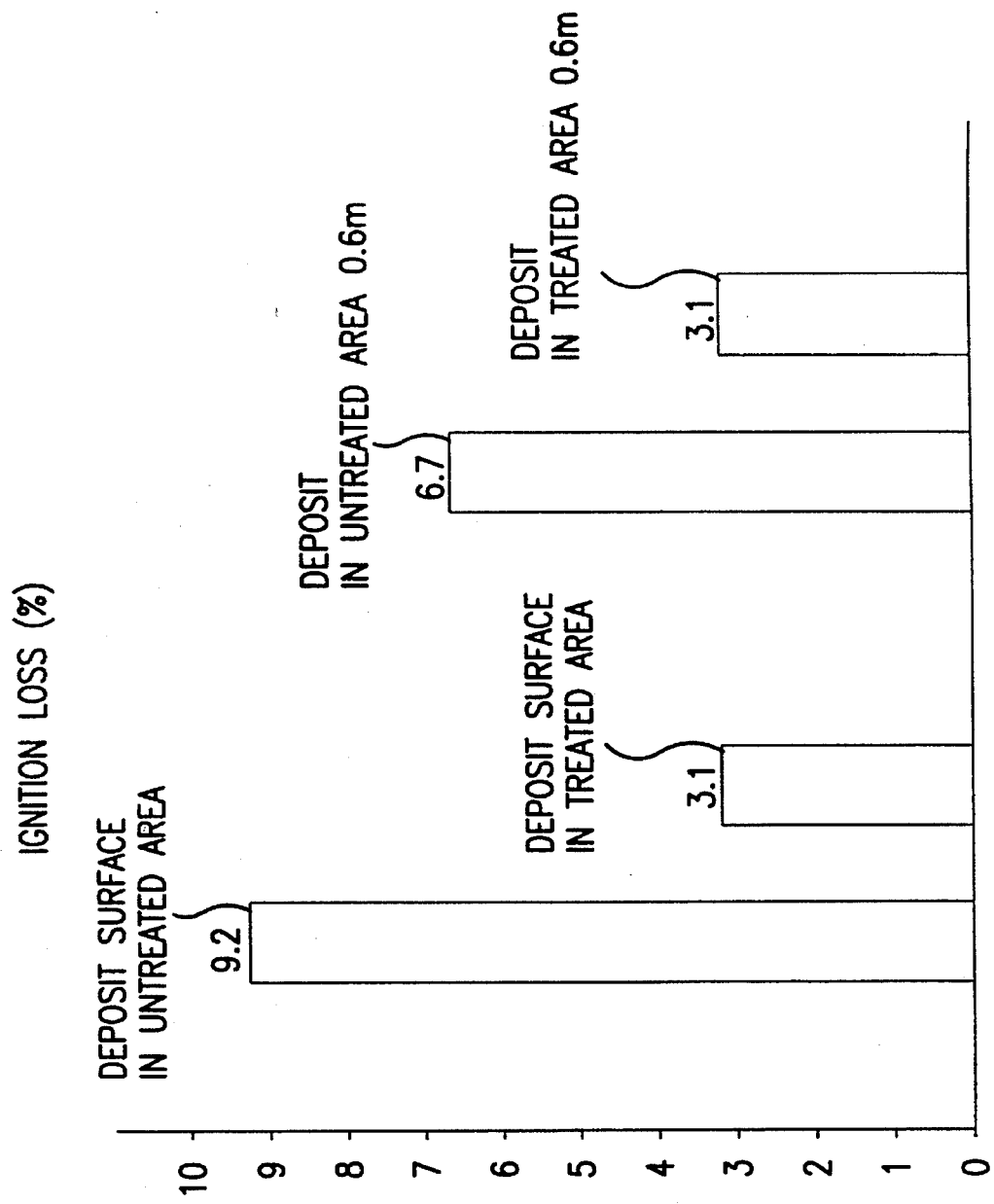

The following description will explain the arrangement of the present invention in detail.

For lime (hereinafter referred as UT) used in the present invention, quick lime or slaked lime on the market which are granulated to a size of a grain of rice by a generally used dry-type or wet-type granulating method is preferably used. When spreading powdered lime, water becomes cloudy. However, when adopting granulated lime, because it settles quickly, the water does not become cloudy. Additionally, when quick lime reacts with water, heat is generated, and pH value of water increases. Therefore, slaked lime is preferable.

Activated sludge and anaerobic sludge (hereinafter referred to as TB) used in the present invention are obtained in the following manner: In a sewage disposal plant and an organic waste water disposal plant, first, moisture control is carried out on the activated sludge in an aerator chamber and digested sludge in an anaerobic digester chamber. Then, after fermenting for a couple of weeks, the moisture controlled activated sludge and digested sludge are granulated to a size of a grain of rice by a generally used method. Here, a biological treatment is done on the activated sludge by aerobic bacteria, such as organic material decomposer bacteria of Achromobacter, Alcaligenes, Pseudomonas, Chromobacterium, Paracolobacterium, Escherichia, or Nitrosomonas. Similarly, a biological treatment is done on the digested sludge by anaerobic bacteria, such as organic material decomposer bacteria of Flavobacterium, Desulfovibrio, Methanobacterium, Serratia, Bacteroides, or Clostridium.

Additionally, anaerobic submerged filter media sludge may be used in replace of anaerobic digested sludge in the digester chamber, or both of the anaerobic digested sludge and anaerobic submerged filter media sludge may be used.

As is generally known, an inorganic flocculant such as PAC (powdered activated carbon), ferric chloride, aluminum sulphate, lime, etc., a polymer flocculant such as cationic, anionic, etc., or nonionic flocculant added in a dewatering process are included in the activated sludge in the aerator chamber and the digested sludge in the digester chamber.

Diatomaceous earth or zeolite (hereinafter referred to as CG) used in the present invention is obtained by granulating diatomaceous earth or material including zeolite on the market to a size of a grain of rice by a generally used method.

The photosynthesis bacteria solution (hereinafter referred to as PB) used in the present invention contains purple sulphurless bacteria and purple sulphur bacteria such as Phodopseudomonas Capsulatus (Fermentation Research Institute No. 879), Phodospirillum rubrum (Fermentation Research Institute No. 878), Chromatium Vinosam (Fermentation Research Institute No. 890), etc., more than $10^8$ strain/ml. When the bacteria concentration in the photosynthesis bacteria solution is less than strain/ml, a desirable effect is difficult to be obtained.

The present invention enables an improvement in the quality of bottom and water in closed water areas where sludge is deposited on the bottom by spreading the described UT, TB, CG, and PB.

In spreading, PB is required to be infiltrated beforehand into at least either one of TB and CG, and preferably into CG.

Here, UT, TB, CG, and PB are preferably used in the following proportions: UT (1–2 parts by weight); TB (3–6 parts by weight); CG (4–6 parts by weight); and PB (3–4 parts by weight).

Additionally, although a quality improvement can be achieved even when UT, TB, CG, and PB are used slightly outside the range of the above proportions, an optimum effect is achieved in the above proportions, and this proportions are preferable in terms of cost as well.

Since the conditions of the bottom and water are different for each water area, respective amounts of TB, CG, PB, and UT to be spread must be adjusted according to the conditions of the sample closed water area. Normally, when 500–600 g/m$^2$ of bottom area in total amount of UT, TB, CG, and PB used in the above proportions are spread, a sufficient improvement can be achieved.

Namely, the purpose of the present invention is to improve the quality of bottom and water in closed water areas where sludge is deposited on the bottom in the following manner: A predetermined total amount of UT, TB, CG, and PB prepared in the above proportions is spread. In a manner to be described later, pollutants suspended in water of the closed water area settle quickly, and hydrogen sulfide contained in the water and the sludge is decomposed, thereby reducing the sludge. Further, Ca ions are effectively released into the water, thereby improving the quality of bottom and water in the closed water area.

UT, TB, CG, and PB to be used in a set of agents for improving the quality of bottom and water in the closed water area of the present invention are preferably prepared in the following manner:

UT, TB, CG, and PB are prepared in the proportions of 1–2 parts by weight, 3–6 parts by weight, 4–6 parts by weight, and 3–4 parts by weight respectively. Here, PB is infiltrated into at least either one of TB and CG, and UT, TB, and CG are separately packed. A set of agents thus prepared can be easily maintained and dealt with.

In infiltrating PB into TB or CG, a predetermined amount of PB is spattered on a predetermined amount of TB or CG, and left for a while before being packed.

Additionally, a predetermined amount of PB may be infiltrated either into TB or CG. Alternatively, a predetermined amount of PB may be divided so as to be infiltrated into both TB and CG. CG is a porous material having many minute holes, therefore it effectively absorbs PB.

The following description will explain the function of the present invention.

Pollutant sources in closed water areas where sludge is deposited on the bottom are roughly classified into the following three groups:

(A) suspended materials;

(B) soluble materials; and (C) materials dissolved from mud deposits on the bottom.

By removing the above pollutant sources, an improvement in the quality of bottom and water can be achieved.

The method for removing the pollutant sources by spreading UT, TB, CG, and PB in the closed water area will be explained below for each group of the above pollutant sources.

In the case of pollutant source (A), because inorganic flocculant and molecular flocculant contained in TB are activated (when completing the third fermenting process, the organic material contained in the activated sludge and anaerobic digested sludge are decomposed by organic material decomposer bacteria, and thus the flocculant is activated), these flocculants, which are released from TB into water, are combined with suspended materials. As a result, the suspended materials are forced to settle. Moreover, because CG has many minute holes which absorb the suspended materials, the suspended materials settle, thereby removing the pollutant source.

In the case of pollutant source (B), a part of the soluble material settles by flocculation and adsorption as in the case of pollutant source (A). Further, because aerobic bacteria contained in the activated sludge in TB are released into the water, organic materials in other portions of the soluble material are decomposed by the aerobic bacteria, thereby removing the pollutant source.

In the case of pollutant source (C), the pollutant source of the material dissolved from mud deposits can be removed by UT as described earlier.

PB infiltrated into TB or CG decomposes the organic material and hydrogen sulfide in the soluble material, and also expedites the decomposition of the soluble material by the aerobic bacteria in TB. Additionally, when spreading PB without it being infiltrated into TB or CG, since it is diffused in water, it will not reach the mud deposits at the bottom.

As previously described, by spreading UT, a calcium sulphate film is formed on the surface of the mud deposits on the bottom, and it serves as a barrier between the mud deposits and water. Thus, after the calcium sulphate film is formed, the pollution due to the materials dissolved from the mud deposits on the bottom can be prevented.

Further, because the mud deposits isolated from water by the calcium sulphate film becomes anaerobic, they are decomposed by anaerobic bacteria contained in the anaerobic digested sludge in TB reached before the calcium sulphate film is formed or anaerobic bacteria in PB, thereby reducing the amount of the mud deposits. In this case, since CG also exists under the calcium sulphate film, and serves as filter media for the anaerobic bacteria, the anaerobic bacteria form an anaerobic bio-film by using CG as a carrier.

Further, releasing of Ca ions into the water has been recognized in the lime spreading method as mentioned earlier. However, when spreading UT, TB, CG, and PB, the amount of released Ca ions rapidly increases as will be shown through examples and comparison examples. Although this phenomenon is not logically supported, from data of the experiments conducted by the inventors or other persons, it seems that PB expedites the solubility of Ca.

As described, the quality of bottom and water is improved by the above functions, and these functions synergize one another.

In the present invention, by preparing UT, TB, CG, and PB as in the previously described set of agents for improving the quality of bottom and water, their functions can be effectively maintained until being used. Moreover, because they can be easily dealt with, they can be effectively spread.

The present invention will be explained in more detail through the following examples and comparison examples. However, the present invention is not limited to them.

EXAMPLE 1

(1) Preparations of UT, TB, CG, and PB

UT: Powdered slaked lime (on the market) granulated to a size of a grain of rice was used.

TB: Activated sludge in an aerator chamber and anaerobic digested sludge in a digester chamber of a sewage disposal plant in North part of Amagasaki-city, Hyogo, Japan, were used. Before being used, first, moisture control was carried out on TB (water contained approximately 50–60 %). Then, after fermenting for three weeks (the maximum temperature during the fermenting process was approximately 85 °C.), the activated sludge and digested sludge (water contained less than 36 %) were granulated to a size of a grain of rice.

CG: Powdered diatomaceous earth on the market was used after granulating to a size of a grain of rice.

PB: Bacteria solution of purple sulphurless bacteria and purple sulphur bacteria ($10^9$ strain/ml) was used.

(2) Seawater and mud deposits in a sample closed water area

Seawater and mud deposits were taken from under a raft in the pearl oyster farm (at the depth of 10 m) in the Matoya-Bay and Mikasho-Bay Farm of Fishermen's Cooperative Association in Mikasho, Isobe-cho, Shima-gun, Mie, Japan.

(3) Treatments

Seven transparent vinylchloride baths (No. 1–7) were prepared.

First, each of the baths (No. 1–7) was filled with the mud deposits of the above (2) to the height of approximately 10 cm from the bottom. Then, each bath is filled to the top with seawater, and then stirred. Thereafter, the baths were left for approximately two hours. As a result, the mud deposits settled in each bath to the height of approximately 10 cm from the bottom.

In the bath No. 1, 100 g/m² of UT, 150 g/m² of TB, 200 g/m² of CG, and 150 g/m² of PB were spread.

In the bath No. 2, 50 g/m² of UT, 200 g/m² of TB, 200 g/m² of CG, and 150 g/m² of PB were spread.

In the bath No. 3, 150 g/m² of TB, 300 g/m² of CG, and 150 g/m² of PB were spread.

In the bath No. 4, 200 g/m² of TB, 200 g/m² of CG, and 200 g/m² of PB were spread.

In either of the above cases, PB was used after being infiltrated into CG.

In the bath No. 5, 100 g/m² of UT, 300 g/m² of TB, and 200 g/m² of CG were spread.

For comparison examples, in the bath No. 6, 200 g/m² of UT was spread, and in the bath No. 7, 600 g/m² of TB was spread.

(4) Results

Visibility of each of the above baths No. 1–7 was visually observed, and respective values of BOD, COD, SS (suspended material), T-N (total amount of nitrogen), T-P (total amount of phosphorus), Ca concentration, and pH were measured by a generally adopted method.

In the state where the mud deposits settled on the bottom (before spreading), the seawater in the bath was cloudy and was gray in color. While it is being stirred, the seawater was cloudy and was dark green in color. After stirring was stopped, the mud deposits settled on the bottom in approximately two hours, and the seawater in the bath was cloudy and was gray in color.

After spreading, the seawater in the bath No. 1 became clear in approximately 24 hours, and the seawater in the baths No. 2–7 became clear in approximately 48 hours. Thereafter, differences in the visibility among 7 baths were not observed, and the seawater of all baths became clear.

In each of the baths No. 1, 2, 5, and 6, a calcium sulphate film with substantially uniform thickness was formed on the entire surface of the mud deposits on the bottom of each bath in approximately 120 hours after spreading.

Further, when approximately 336 hours had passed after spreading, in the bath No. 1, the height from the bottom to the calcium sulphate film was less than 7 cm. On the other hand, the height in the bath No. 6 did not change.

Analyses and results of measurements were shown in Table 1.

TABLE 1

| bath | BOD (mg/l) | COD (mg/l) | SS (mg/l) | T-N (mg/l) | T-P (mg/l) | Ca (mg/l) | pH |
| --- | --- | --- | --- | --- | --- | --- | --- |
| before spreading | | | | | | | |
| baths No. 1-7 | 4.2 | 4.2 | 270 | 3.4 | 0.0771 | 310 | 8.2 |
| 48 hours after spreading | | | | | | | |
| No. 1 | 1.5 | 2.6 | 4.3 | 3.7 | 0.13 | 370 | 8.3 |
| No. 2 | 2.1 | 2.9 | 24.0 | 3.9 | 0.11 | 350 | 8.3 |
| No. 3 | 0.8 | 3.5 | 13.0 | 4.1 | 0.14 | 350 | 8.3 |
| No. 4 | 0.5 | 3.9 | 9.3 | 4.3 | 0.24 | 350 | 8.3 |
| No. 5 | 1.5 | 2.3 | 7.3 | 3.3 | 0.016 | 350 | 8.3 |
| No. 6 | 1.3 | 2.2 | 4.3 | 2.7 | 0.022 | 360 | 8.5 |
| No. 7 | 1.6 | 3.6 | 5.6 | 6.3 | 0.43 | 350 | 8.3 |
| 120 hours after spreading | | | | | | | |
| No. 1 | <0.5 | 3.0 | 7.7 | 3.9 | 0.14 | 450 | 8.2 |
| No. 2 | 0.5 | 3.2 | 3.3 | 3.8 | 0.11 | 370 | 8.1 |
| No. 3 | <0.5 | 4.1 | 3.0 | 4.2 | 0.14 | 350 | 8.0 |
| No. 4 | <0.5 | 4.5 | 3.7 | 6.7 | 0.25 | 360 | 8.0 |
| No. 5 | 0.7 | 2.3 | 1.3 | 3.5 | 0.038 | 360 | 8.2 |
| No. 6 | <0.5 | 1.7 | 2.0 | 2.6 | 0.02 | 380 | 8.1 |
| No. 7 | 0.6 | 4.6 | 4.3 | 7.4 | 0.09 | 370 | 8.0 |
| 216 hours after spreading | | | | | | | |
| No. 1 | 0.7 | 2.6 | 4.0 | 3.8 | 0.13 | 500 | 8.2 |
| No. 2 | 0.5 | 2.8 | 3.3 | 3.8 | 0.13 | 390 | 8.0 |
| No. 3 | 0.7 | 4.0 | 1.0 | 4.1 | 0.14 | 360 | 7.9 |
| No. 4 | 0.4 | 4.6 | 3.3 | 4.6 | 0.20 | 370 | 8.0 |
| No. 5 | 0.6 | 2.1 | 5.7 | 3.5 | 0.027 | 370 | 8.1 |
| No. 6 | 0.7 | 1.7 | 7.5 | 2.7 | 0.027 | 400 | 8.0 |
| No. 7 | 0.6 | 5.4 | 3.7 | 7.1 | 0.11 | 370 | 7.9 |
| 336 hours after spreading | | | | | | | |
| No. 1 | 0.6 | 2.9 | 1.0 | 4.0 | 0.11 | 560 | 8.4 |
| No. 2 | 0.7 | 3.0 | 1.2 | 4.0 | 0.11 | 420 | 8.2 |
| No. 3 | 0.9 | 3.9 | 2.0 | 4.2 | 0.089 | 360 | 8.2 |
| No. 4 | 1.1 | 4.8 | 0.6 | 4.5 | 0.091 | 360 | 8.1 |
| No. 5 | <0.5 | 2.8 | 1.6 | 3.6 | 0.011 | 390 | 8.4 |
| No. 6 | <0.5 | 2.0 | 5.0 | 3.0 | 0.011 | 420 | 8.2 |
| No. 7 | 0.7 | 6.1 | 2.2 | 7.0 | 0.084 | 380 | 8.2 |

In the analyses and measurements of the samples before spreading, seawater being stirred was used. In the analyses and measurements after spreading, seawater in the baths wherein deposits settle on the bottom was used.

Values obtained from the baths No. 1–5 (examples), and the baths No. 6 and 7 (comparison examples) after spreading were all adaptable to the ecological environment as can be seen from Table 1. Additionally, in the baths No. 1 and 2, a large amount of calcium was dissolved (especially in the bath No. 1).

As to the bath No. 7, due to the addition of TB, the respective values for COD, T-N, and T-P increased. On the other hand, in spite of the addition of TB, and PB, increases in respective values for COD, T-N, and T-P were restrained in the baths No. 1 and 2.

In the bath No. 7, T-N value was above 6.3 mg/l. Thus, it should be noted that in a theory T-N value above 5.0 mg/l affects fish and shellfish.

Moreover, because UT, TB, and CG granulated to a size of a grain of rice were used, they reached the mud deposits on the bottom quickly, and they could be mechanically spread by a spreader.

EXAMPLE 2

In the optimum proportions of bacteria (proportions in the bath No. 1) obtained from results of example 1, the improvement in the water quality and the reduction in the amount of the mud deposits (decompositions of organic materials) were achieved.

Bath A (0.5 m×0.5 m×0.8 m), bath B (0.5 m×0.5 m×0.8 m), and bath C (0.3 m×0.3 m×0.3 m) were prepared. First, each bath was filled with mud deposits to the height of approximately 15 cm. Then, each bath was filled to the top with seawater. In this state, the temperature of the seawater in baths A and B was controlled at 24° C. and the temperature of the seawater in bath C was controlled at room temperature (14 ° C.).

UT, CG, TB, and PB were added into baths B and C in the proportions of: UT 100 g/m2; CG 200 g/m2; TB 150 g/m$^2$; and PB 150 g/m2. For comparison, none of the above were added into bath A.

The results of measurements are shown in Table 2 and Table 3.

TABLE 2

|  | BOD (mg/l) | COD (mg/l) | SS (mg/l) | T-N (mg/l) | T-P (mg/l) | Ca (mg/l) | pH |
| --- | --- | --- | --- | --- | --- | --- | --- |
| March 14 | | | | | | | |
| Original Water | 4.6 | 4.6 | 13 | 7.0 | 0.082 | 310 | 8.2 |
| March 30 | | | | | | | |
| bath A | 4.8 | 5.5 | 5.0 | 7.8 | 0.09 | 315 | 8.2 |
| bath B | 3.0 | 2.8 | 1.6 | 4.8 | 0.21 | 560 | 8.4 |
| bath C | 0.8 | 1.8 | 0.6 | 6.4 | 0.18 | 420 | 8.3 |

TABLE 3

| | Change in Mud Deposits | | |
| --- | --- | --- | --- |
| | 3/16 | 3/22 | 3/31 |
| Bath A | 15 cm | 15 cm | 16 cm |
| Bath B | 15 cm | 13 cm | 10 cm |
| Bath C | 15 cm | 14.5 cm | 13 cm |

Even considering the respective conditions under which the mud deposits were taken, placed into the baths used in the sample, and physical differences due to specific gravity, significant differences were observed between baths B and C, and bath A.

Example 3

This experiment was carried out using mud deposits from an in-ocean oyster farm.

The mud deposits on the bottom were classified into two groups: first deposit and second deposit. The first deposit was defined as a deposit which is made of inorganic materials; and the second deposit is defined as a deposit which is not made of-inorganic materials (upper portion of the sludge). Here, the second deposit was used as a sample for this experiment, and the reduction in the amount of mud deposits by decomposition, and improvement in purification of the water were achieved.

(1) Place and date of the experiment

Place: Pearl Oyster Farm of Fishermen's Cooperative Association at Mikasho, Isobe-cho, Shima-gun, Mie, Japan Date: Mar. 31, 1992

(2) Equipment used in the experiment

In order to separate the untreated area and the treated area, a sheet was provided so as to make the above areas independent from one another.

(3) Operations

UT, CG, TB, and PB were added in the following order:

1) Anaerobic sludge digested bacteria (TB) were injected into the mud deposits, and spread onto the surface of the mud deposits.

Injection

Injection pipe diameter: 0.06 m

Depth: 0.6 m

Number of injections: 60 (3/m$^2$)

Proportion of an injection: sand 1 kg TB 30 g (3 %)

Amount of injection (Total): 0.113 m

Spreading

TB (150 g/m2) was spread from above sea level. Spread amount of TB: 3 kg (150 g×20 m$^2$)

2) Granular slaked lime (UT) (100 g/m2) was spread from above sea level.

Spread amount of slaked lime: 2 kg (100 g×20 m$^2$)

3) Aerobic sludge digested bacteria (TB) and the photosynthesis bacteria solution ( PB ) were mixed with diatomaceous earth (CG), and the mixture (350 g/m$^2$) was spread from above sea level.

Mixing ratio: CG:PB:TB=2:1:0.5

Spread amount of the mixture, 7 kg (350 g×20 m$^2$)

Conditions of the treaded area after injection and spreading are shown in FIG. 1.

Figure 12B:
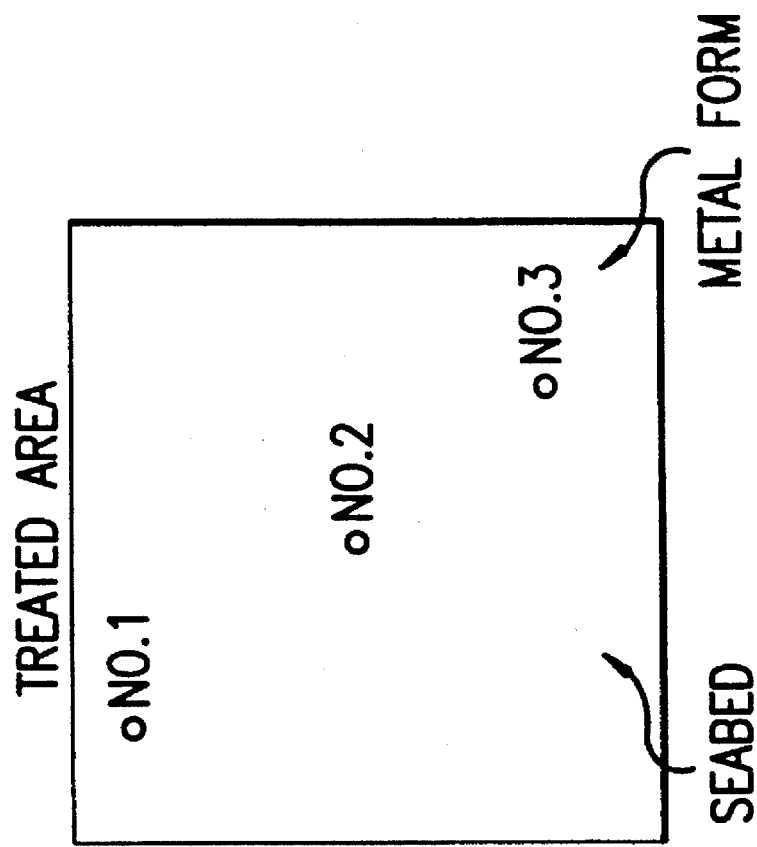
Figure 12A:
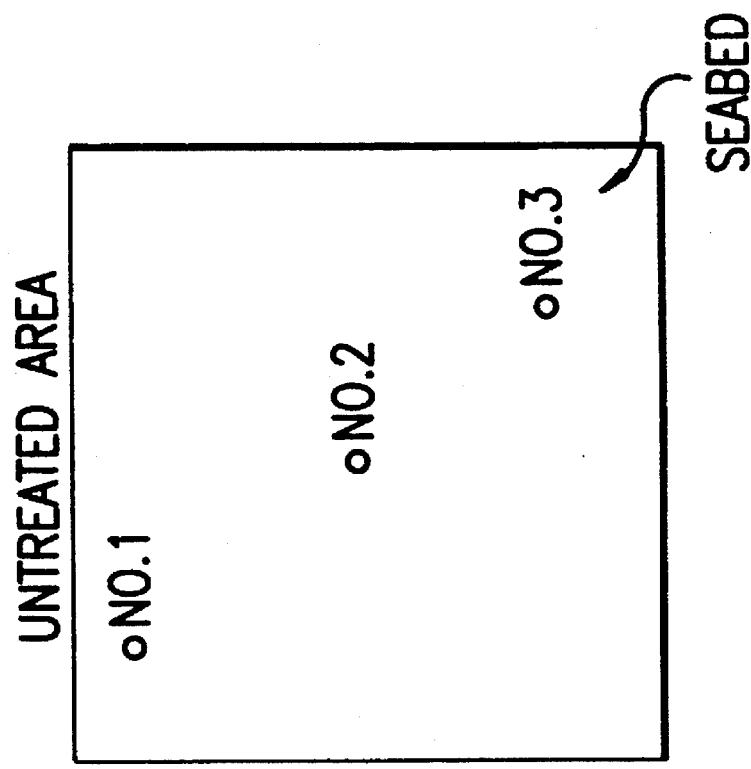

The sludge was sampled after a predetermined time period, and the respective amounts of organic nitrogen, organic phosphoric acid, inorganic nitrogen, and inorganic phosphoric acid contained in the sludge, and ignition loss were measured. The results of the measurements of Jul. 24, 1992 are shown in FIGS. 2 –6, and the results of the measurements of September 3, 1992 are shown in FIGS. 7–11. Further, reduced amounts of deposits (settled) are shown in Table 4. The places where the reduced amounts of deposit were measured are shown in FIG. 12(a) and FIG. (b).

TABLE 4

| Treatment date | Time | Seawater (°C.) Temperature 10 cm below sea level | Seabed | Subsidence (mm) in treated are | | | | Subsidence (mm) in untreated area | | | |
| --- | --- | --- | --- | --- | --- | --- | --- | --- | --- | --- | --- |
| | | | | Water gage Height | | | | Water gage Height | | | |
| | | | | No. 1 | No. 2 | No. 3 | Av. | No. 1 | No. 2 | No. 3 | Av. |
| 3.31 | 9:00 | 12.0 | 11.0 | 280 | 260 | 280 | 0 | 800 | 220 | 130 | 0 |
| 4.30 | 13:30 | 18.5 | 17.0 | 260 | 240 | 260 | 20 | 800 | 220 | 130 | 0 |
| 5.29 | 13:30 | 20.0 | 19.0 | 260 | 230 | 240 | 30 | 800 | 220 | 130 | 0 |
| 6.30 | 12:00 | 21.0 | 19.5 | 260 | 230 | 240 | 30 | 810 | 220 | 130 | 0 |
| 7.24 | 9:20 | 25.0 | 22.0 | 220 | 210 | 240 | 50 | 810 | 220 | 130 | 0 |
| 9.3 | 11:20 | 27.0 | 25.0 | 210 | 200 | 220 | 63 | 810 | 220 | 130 | 0 |

TABLE 4-continued

| Treatment date | Time | Seawater (°C.) Temperature 10 cm below sea level | Seabed | Subsidence (mm) in treated are Water gage Height | | | | Subsidence (mm) in untreated area Water gage Height | | | |
|---|---|---|---|---|---|---|---|---|---|---|---|
| | | | | No. 1 | No. 2 | No. 3 | Av. | No. 1 | No. 2 | No. 3 | Av. |
| 9.26 | 14:30 | 22.0 | 22.0 | 210 | 200 | 220 | 63 | .810 | 220 | 150 | 0 |

From the measured values shown in FIGS. 2–11, reductions in the amounts of organic nitrogen, and organic phosphoric acid, and ignition losses were observed in both the surface of the mud deposits and 60 cm below the surface.

The invention being thus described, it will be obvious that the same way be varied in many ways. Such variations are not to be regarded as a departure from the spirit and scope of the invention, and all such modifications as would be obvious to one skilled in the art are intended to be included within the scope of the following claims.

What is claimed is:

1. A set of agents used in improving the quality of bottom and water in water areas where sludge is deposited on the bottom, including:

1–2 parts by weight of lime, 3–6 parts by weight of activated sludge and anaerobic sludge, 4–6 parts by weight of diatomaceous earth or zeolite, and 3–4 parts by weight of photosynthesis bacteria solution, and wherein:

the photosynthesis bacteria solution is infiltrated into at least either one of the activated sludge and anaerobic sludge, and the diatomaceous earth or zeolite; and the lime, the activated sludge and anaerobic sludge, the diatomaceous earth or zeolite are separately packed.

* * * * *